United States Patent
Kumar et al.

(10) Patent No.: US 9,094,296 B2
(45) Date of Patent: Jul. 28, 2015

(54) METHOD AND APPARATUS FOR DETERMINING TRAP/EVENT INFORMATION VIA INTELLIGENT DEVICE TRAP/EVENT REGISTRATION AND PROCESSING

(75) Inventors: Vijay Kumar, Pittsford, NY (US); Lawrence W. Meyer, Fairport, NY (US)

(73) Assignee: XEROX CORPORATION, Norwalk, CT (US)

( * ) Notice: Subject to any disclaimer, the term of this patent is extended or adjusted under 35 U.S.C. 154(b) by 563 days.

(21) Appl. No.: 13/449,917

(22) Filed: Apr. 18, 2012

(65) Prior Publication Data
US 2013/0278959 A1 Oct. 24, 2013

(51) Int. Cl.
| | |
|---|---|
| G06K 15/00 | (2006.01) |
| G06F 3/12 | (2006.01) |
| G06F 15/177 | (2006.01) |
| H04L 12/24 | (2006.01) |
| H04L 29/06 | (2006.01) |

(52) U.S. Cl.
CPC ............ *H04L 41/0681* (2013.01); *H04L 63/14* (2013.01); *H04L 41/0213* (2013.01); *H04L 41/0273* (2013.01)

(58) Field of Classification Search
CPC ........ G06K 15/08; G06F 11/30; G06F 11/3051
See application file for complete search history.

(56) References Cited

U.S. PATENT DOCUMENTS

| | | | |
|---|---|---|---|
| 5,706,508 A | 1/1998 | Chen et al. | |
| 6,108,099 A * | 8/2000 | Ohtani | 358/1.15 |
| 6,336,184 B1 | 1/2002 | Burke et al. | |
| 8,139,581 B1 * | 3/2012 | Mraz et al. | 370/392 |
| 2003/0126240 A1 * | 7/2003 | Vosseler | 709/221 |

* cited by examiner

*Primary Examiner* — Thomas Lett
(74) *Attorney, Agent, or Firm* — Fay Sharpe LLP

(57) ABSTRACT

Methods and systems are disclosed comprising a trap/event registration mechanism wherein a management system in a device network registers each trap/event type on a separate unique listener port. Each unique port number has intelligent binding of the kind of trap/event that can be received thereat. Each trap/event type is tightly bound to the special unique listener port so that the management system will know by virtue of receiving the trap/event at the unique port what kind of trap/event occurred on the device.

9 Claims, 5 Drawing Sheets

| MANAGEMENT SYSTEM(S) ADDRESS | MANAGEMENT SYSTEM(S) LISTENER PORT | EVENT\TRAP TYPES |
|---|---|---|
| 13.121.234.56 | 20156 | MACFEE INTRUSION ALERTS |
| 13.121.234.56 | 21517 | PRINTER MALFUNCTION\FAULTS RELATED ALERTS |
| 13.121.234.56 | 21108 | PRINTER SUPPLIES RELATED ALERTS |
| 13.121.234.56 | 22116 | PRINTER REBOOT (WARM OR COLD START) RELATED |

| REGISTRATERED TRAP/EVENT LISTENER LIST | | |
|---|---|---|
| MANAGEMENT SYSTEM(S) ADDRESS | MANAGEMENT SYSTEM(S) LISTENER PORT | EVENT/TRAP TYPES |
| 13.121.234.56 | 162 | MACFEE INTRUSION, PRINTER MALFUNCTION, LOW SUPPLIES, AUTHENTICATIONS FAILURE AND COLD/WARM START ALERTS |

FIG. 1

| REGISTRATERED TRAP\EVENT LISTENER LIST | | |
|---|---|---|
| MANAGEMENT SYSTEM(S) ADDRESS | MANAGEMENT SYSTEM(S) LISTENER PORT | EVENT\TRAP TYPES |
| 13.121.234.56 | 20156 | MACFEE INTRUSION ALERTS |
| 13.121.234.56 | 21517 | PRINTER MALFUNCTION\FAULTS RELATED ALERTS |
| 13.121.234.56 | 21108 | PRINTER SUPPLIES RELATED ALERTS |
| 13.121.234.56 | 22116 | PRINTER REBOOT (WARM OR COLD START) RELATED |

FIG. 3

METHOD AND APPARATUS FOR DETERMINING TRAP/EVENT INFORMATION VIA INTELLIGENT DEVICE TRAP/EVENT REGISTRATION AND PROCESSING

BACKGROUND

The invention field relates to methods and apparatus for communicating, registering and processing a trap/event information signal in a network for the events that occur in agent devices in the network. More particularly, the subject embodiments relate to a trap/event registration mechanism wherein a management system registers distinct trap/event types on separate management system input ports, wherein an event signal at a port corresponds to a unique trap/event type.

Network devices and systems typically have management protocols like SNMP (Simple Network Management Protocol) which allows a management system to register for events that occur in the device. There can be multiple events occurring inside the device in which the management system might be interested. SNMP trap/event registration and processing essentially involves two network systems. A trap/event generator system typically relates to any embedded device agent/computing system agent which sends a message when some state change happens inside the device and has to be acted upon for the device's optimum functionality. A trap listener system relates to any management system which is interested in receiving the messages from a trap/event generator and wants to act on the message. The device management system is responsible for managing the device/agent (e.g. printers) by interrogating the device's state and status using well known protocols such as SNMP and/or SOAP (an XML protocol) based web devices. Usually a management system uses one of two methods to talk to a device/agent. An active device polling method involves polling the device periodically by the device management system to gather/interrogate the device about its state and status or events happening inside the device. A passive event/trap listening method is used by a device management system to listen on management system ports for the traps/events happening inside the device. Whenever a trap/event occurs inside the device/agent/printer, the device sends the event to the interested device management system at a specific port for an application to act upon those events. A device management system shows interest in receiving a trap/event by registering itself as an intended trap/event recipient party by calling the device's trap/event registration method. The device management system provides specifics (such as address, port and type of trap/event), as parameters to the registration request.

The current protocol mechanism for the trap registration process is to register all the interested traps/events and have a device report all these events at the standard trap port (e.g. 162 of a management system. So whenever any trap/event occurs inside the device, they are all received on the same standard port number. Some systems involve decoding the signal to identify the trap/event (see U.S. Pat. No. 6,336,184). The systems which do not involve decoding have no indication of what kind of trap/event has occurred inside the device and thus must determine the type of event that has happened into the device by polling the device to get more information to determine what trap/event occurred.

FIG. 1 shows a typical current management system user interface for a trap/event registration. The management system always uses the well-known port 162. For example, if the device management system is interested in receiving traps/events for virus intrusion, printer faults, low supplies, authentication failure and printer/device warm, it will register itself with the device as an intended recipient. So whenever any of the above-mentioned traps/events occurs inside the device, the device agent will send the alert to port 162. A management system has no indication of what kind of trap/event has occurred inside the device agent if it cannot decode the received trap/event signal packet. The management system only knows that some event has happened inside the device upon which it must act. It will have to poll and probe the device again to find out what event exactly occurred in the device and get the associated event data from the device. Such polling will have to be done for each and every trap/event received by the management system, causing scalability, and performance issues. It will also cause unnecessary network traffic.

FIG. 2 depicts such a use case scenario. The network system includes a management system 10 with embedded a printers/device/agent 12 and communication is effected between these devices via processes for trap registration 14, trap processing 16 and trap listening 18. The first step in the process involves registering for virus intrusion, printer fault, low supplies, authentication failure and cold start traps. The second step is to start a trap listener process to listen for incoming traps. The registration process is illustrated in steps 20 and 24, at which point a device/agent becomes registered for sending trap/event notification signals to the management system port P1. The step 22 illustrates the trap listener process which must be started by management system to receive the trap(s). When a trap/event occurs at the device/agent/printer, the trap/event signal is received 26 at the trap listener port and the management system then receives the trap information, but if no decoding is involved, there is no indication of what type of the trap/event has actually occurred at the device/agent. In order to obtain such information, the management system trap processor queries the device/agent 30 whereupon the type of trap related information is communicated by a device/agent to the management system processor and thereafter the management system is notified 32 about trap details and device status.

Thus, there is a need for SNMP communication signal management system which does not have to decode device/agent trap/event signals, or which involves subsequent polling to a trap/event signal received at a single management port.

SUMMARY OF THE PREFERRED EMBODIMENTS

A data processing system is provided for communicating data between an agent/device, respectively bound with a particular trap/event type. On generation of a trap/event signal by an agent/device the trap/event signal is communicated to the one trap/event listener port corresponding to a type of the trap/event signal, and upon receipt of the trap/event signal at the one trap/event listener port, the manager identifies the trap/event type occurring at the device/agent.

In accordance with alternative aspects of the proposed embodiments, a method is provided for communicating trap/event signals from a device/agent/printer to a network management system. The method includes registering a plurality of management systems listener ports to particular trap/event types, respectively, wherein a unique one of the listener ports is bound to the trap/event type. Upon occurrence of a bound trap/event type at the device/agent/printer, a signal is communicated representative of the trap/event type to a corresponding bound management system listener port by the device/agent/printer. The network management system can identify the communicated signal as indicative of the trap/event type occurring at the device/agent/printer by the receipt of the signal at the bound management system listener port.

BRIEF DESCRIPTION OF THE DRAWINGS

FIG. 1 is a representation of a registered trap/event listener list data table wherein a plurality of event/trap types are associated with a single management system listener port and a single management system address;

FIG. 3 is a registered trap/event listener list data table wherein a plurality of distinct event/trap types are uniquely and intelligently bound with distinct management system listener ports at a management system address;

DETAILED DESCRIPTION

Figure 2:
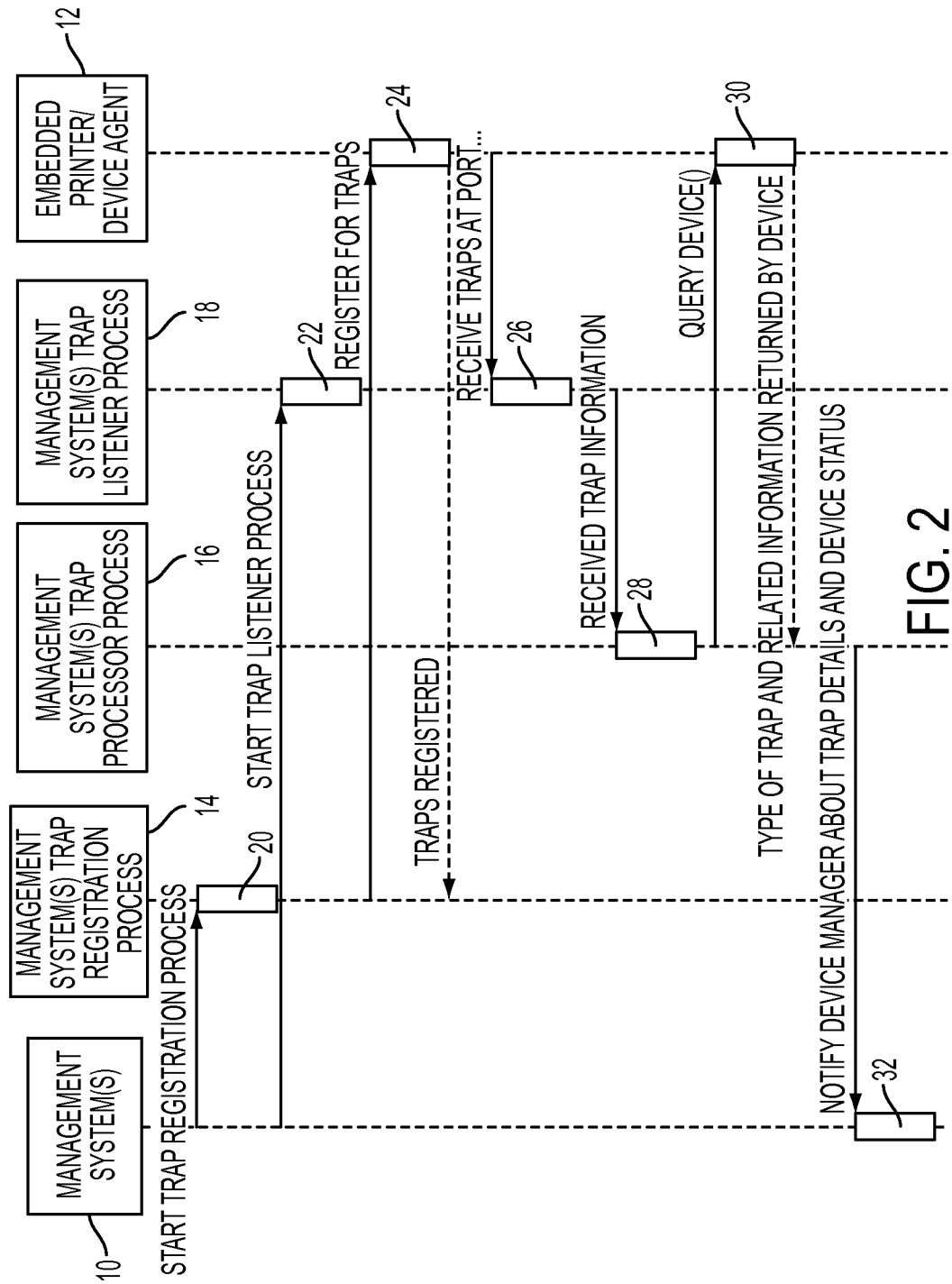
FIG. 2 is a flowchart showing communication signal steps for communication between a device/agent and a management system utilizing the data table of FIG. 1 wherein device queries are conditionally required for identifying a type of trap/event and related information.

In accordance with the preferred embodiments, the subject management system trap/event registration and trap/event listener process will bring significant performance and scalability improvements with faster turnaround time to report device problems and issues. The preferred embodiments will also cause less network traffic to agents/devices from managements systems and management system trap processing processors.

The subject preferred embodiments comprise a new trap/event registration mechanism that instead of registering for all the different trap/event types on a single standard trap port, will register a single trap type or a group of trap types on a separate unique port as shown in FIG. 3. As shown therein, a registered trap/event listener list data table 40 includes three types of associated data: Event/Trap Types 42 include a single trap type or a group of trap types comprising an event that occur on a device/agent/printer that needs to be communicated to the management system or a device manager. A plurality of management system listener ports 44 are intelligently bound to the event/trap types 42 wherein a unique port is associated with a single trap type. It can be seen that each each trap type is associated with a distinct listener port. Lastly, management system address 46 identifies, in combination with port 44, to where a communication signal representative of the event/trap type can be sent by the device/agent to the management system.

It can be seen that each unique port number 44 has an intelligent binding with the kind of trap/event it is going to receive. For example, in FIG. 3, a device/printer 12 will send MacAfee intrusion alerts 48 on port 20156. As each trap/event type (MacAfee intrusion) is tightly bound to the special user defined port (20156), the management system 10 need not poll the device 12 again. It knows by virtue of receiving the trap/event signal at the certain port what kind of trap/event occurred on the device. The management system can then notify concerned systems, components or persons about the impending device event/trap immediately without querying or interpreting the device data any further. This will result in faster turnaround time to report device problems.

Figure 4:
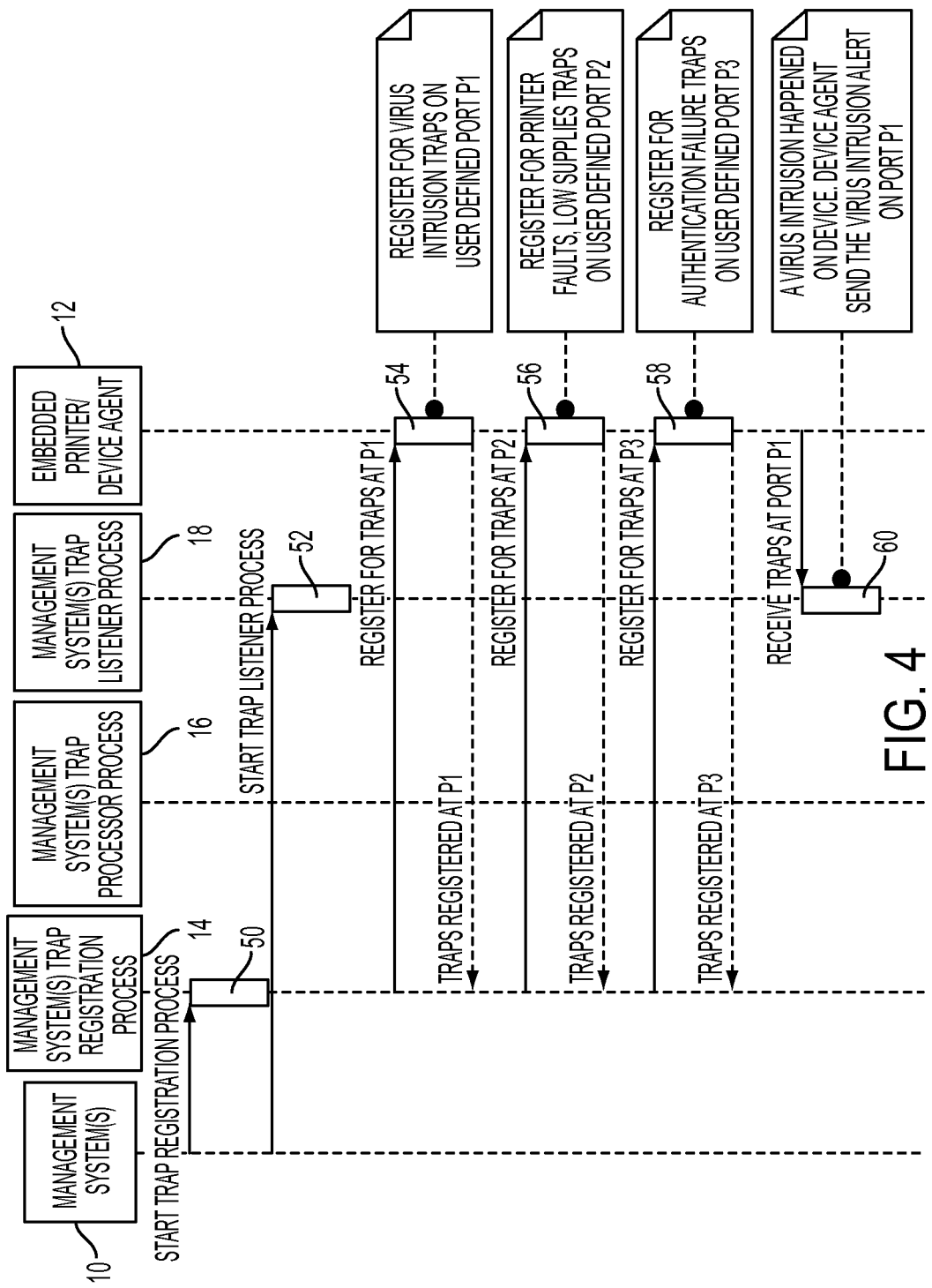
FIG. 4 is flowchart of the steps for communicating between a device/agent/printer and a management system utilizing the data table of FIG. 3; and, FIG. 5 is a flowchart further depicting the communication steps transmitted device/agent/printer and the management system utilizing the data table of FIG. 3.
Figure 5:
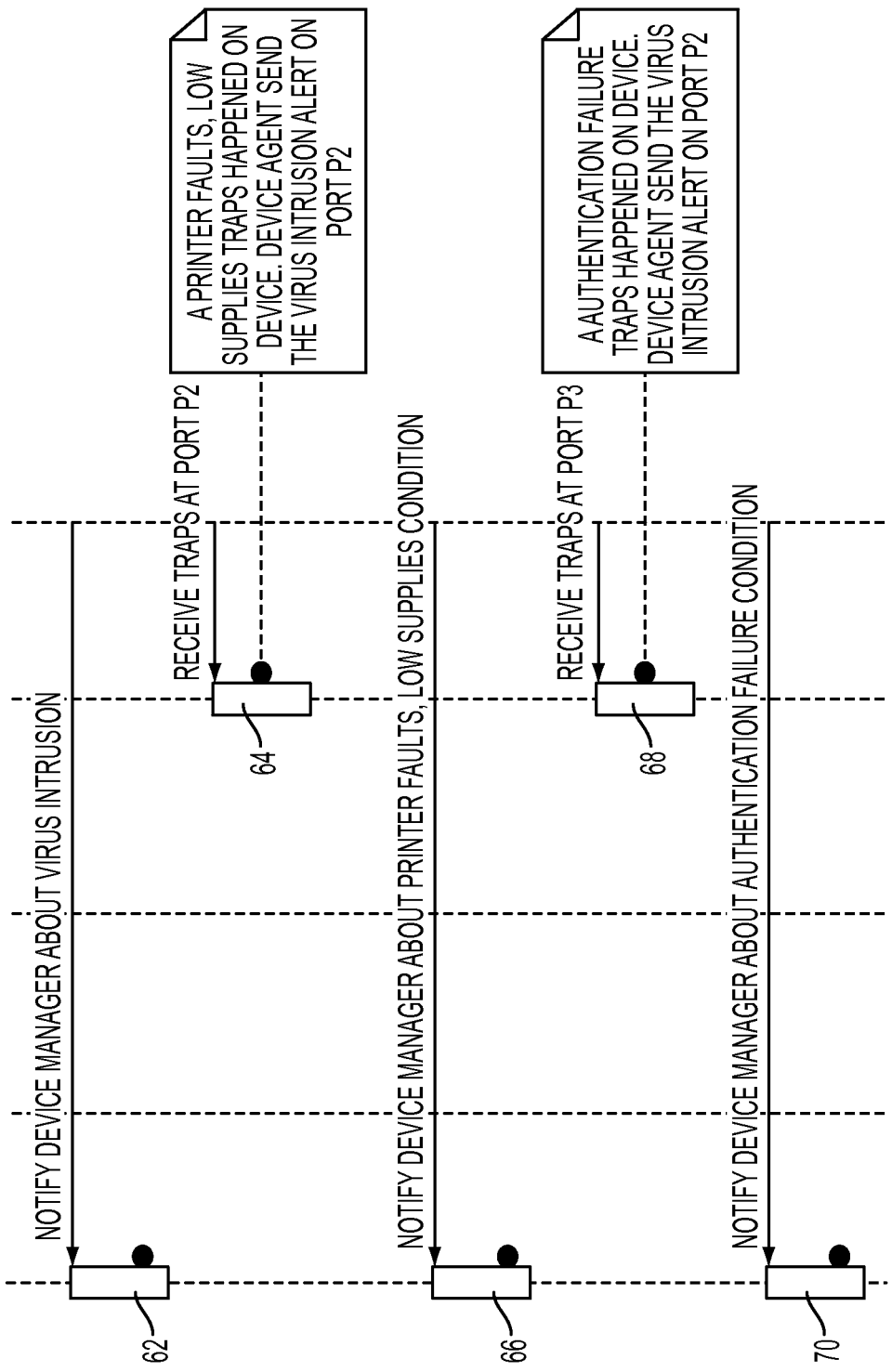

With reference to FIGS. 4 and 5, a use case scenario in accordance with the preferred embodiments employing the data table of FIG. 3 is elaborated. Similar to FIG. 2, the network management system includes a management system 10 and an embedded printers/device/agent 12 with trap registration processes 14, trap processor processes 16, and a management system trap listener processors 18. FIG. 4 particularly shows the steps in effecting trap/event registration with a listener port. Steps 50 and 52 comprise the starting of the trap registration process and the starting of the trap listener process. At step 54 a unique listener port, P1, is bound to a particular trap/event type, a virus intrusion trap. Other ports P2 and P3 are registered for other event types, printer faults 56 or authentication failure 58. The registration is effected by the management system communicating the data table of FIG. 3 to the device/agent for storage therein. Event 60 is an illustration of what happens when a virus intrusion alert happens at the device/agent. In FIG. 5, the virus intrusion alert signal is communicated by the device/agent to port P1. Since the trap/event signal is received by the device management listener port P1, which is the dedicated port for virus intrusion, the manager immediately knows the type/event type, virus intrusion, without any ambiguity of what kind of trap is being received and without further need for querying the device further. The device management listening process 62 can definitively notify the device manager about this alert for further processing. A similar notification of the device manager occurs after receiving a trap/event signal on listening port P2, 64 indicative of a printer fault, and low supplies wherein the device manager is notified 66 about printable event by the management system tap listener process. Again, when a trap/event signal occurs at port P3, 68, indicating authentication failure trap signal, the management system trap listener process communicates 70 to the device manager about the subject authentication failure condition.

It will be appreciated that variants of the above-disclosed and other features and functions, or alternatives thereof, may be combined into many other different systems or applications. Various presently unforeseen or unanticipated alternatives, modifications, variations or improvements therein may be subsequently made by those skilled in the art which are also intended to be encompassed by the following claims.

What is claimed is:

1. A method for communicating trap/event signals from a device/agent/printer to a network management system including:

registering a plurality of management system listener ports within the network management system to particular trap/event types, respectively, wherein a unique one of the listener ports is bound to the trap/event type;

upon occurrence of a bound trap/event type at the device/agent/printer, communicating a signal representative of the trap/event type to a corresponding bound management system listener port by the device/agent/printer; and, identifying the communicated signal as indicative of the trap/event type occurring at the device/agent/printer by the receipt of the signal at the bound management system listener port.

2. The method of claim 1 further including notifying a device manager of the network management system about the occurring trap/event and device/agent/printer status.

3. The method of claim 1 wherein the registering includes binding the plurality of management listener ports to trap/event types comprising virus intrusion alerts, printer faults, low supplies, authentication failure and cold start traps.

4. The method of claim 1 wherein the registering includes the network management system communicating with the device/agent/printer to set a data table internal to the device/agent/printer comprising a registered trap/event listener port list including a plurality of event/trap types, wherein a one of the event/trap types is uniquely bound to a distinct management system listener port and a management system address.

5. The method of claim 4 wherein upon occurrence of the one event/trap type, the device/agent/printer references the data table and communicates a signal representative of the event/trap type to the bound distinct port at the management system address.

6. A network management system for communicating data between a device agent including a trap/event generator and a management system including a trap listener processor, wherein the management system has a plurality of trap/event listener ports bound with a particular trap/event type, respectively, wherein upon generation of a trap/event signal by a device agent, the trap/event signal is communicated to the one trap/event listener port corresponding to a type of the trap/event signal, and upon receipt of the trap/event signal by the management system at the one trap/event listener port, the management system identifies the trap/event type of the trap/event occurring at the device agent.

7. The network management system of claim 6 wherein the device agent includes a device data table binding the particular trap/event type with the one trap/event listener port whereby upon occurrence of the particular trap/event type, the device agent will reference the table to identify the one corresponding trap/event listener port and communicate the trap/event signal thereto.

8. The network management system of claim 7 wherein the management system includes a management system data table binding the particular trap/event type with the one trap/event listener port whereby upon occurrence of the particular trap/event type, and receipt of the trap/event signal at the one corresponding trap/event listener port, the management system identifies the particular trap/event type.

9. The network management system of claim 8 wherein the device data table and the management system data table include trap/event types comprising virus intrusion alerts, printer malfunction/faults related alerts, printer supplies related alerts, authentication failure alerts, and printer reboot (warm or cold start) related alerts.

* * * * *